UNITED STATES PATENT OFFICE.

GEORG EGLY, OF CHARLOTTENBURG, GERMANY, ASSIGNOR TO GEBR. SIEMENS & CO., OF CHARLOTTENBURG, GERMANY.

PROCESS FOR THE MANUFACTURE OF SOLID-FASHIONED BODIES CONTAINING SILICON CARBID.

1,012,531.     Specification of Letters Patent.     Patented Dec. 19, 1911.

No Drawing.     Application filed October 16, 1905. Serial No. 283,051.

*To all whom it may concern:*

Be it known that I, GEORG EGLY, a subject of the German Emperor, residing at 70 Kantstrasse, Charlottenburg, near Berlin, in the German Empire, chemist, have invented certain new and useful Improvements in Processes for the Manufacture of Solid-Fashioned Bodies Containing Silicon Carbid, of which the following is a specification.

Attempts have frequently been made to render silicon carbid (carborundum) useful for various purposes, and particularly for bodies which are to be heated electrically, such as rods, tubes or the like, for which purpose the silicon carbid must be brought into the desired form. The introduction of silicon carbid for such purposes, however, has hitherto met with the difficulty that it has not been possible to fashion silicon carbid into forms having the properties necessary for the use to which they are to be put. For many uses, as grindstones, for instance, the powdered silicon carbid has been mixed with a considerable proportion of an agglutinant such as clay; but bodies fashioned in this manner have relatively little solidity and are generally very porous; moreover, their electrical conductivity is exceedingly small or does not exist.

The present invention relates to the manufacture of bodies containing silicon and carbon which are not only good electrical conductors, but are at the same time dense, solid, mechanically strong and capable of withstanding chemical agents and high temperature.

The invention consists in mixing the silicon carbid with uncombined silicon. The silicon carbid and silicon are mixed as intimately as possible and fashioned into the desired form. As an aid for this purpose may be used any suitable agglutinant, preferably one which is volatile, such as glycerin; or the agglutinant may be a material which will carbonize when heated, as the separated carbon combines with the silicon in the mass when the form is subsequently heated. Obviously, the agglutinant may also be one which will remain wholly or in part in the form after it has been heated, such as clay or boric acid. Generally speaking, however, foreign matter of this kind is undesirable, as it may easily depreciate the good properties which the form consisting of silicon and silicon carbid alone otherwise possesses. When boric acid is used as the agglutinant, it is advantageous to dissolve it first in glycerin, whereby it is distributed throughout the mass as uniformly as possible. The glycerin is especially useful in that it makes the mass very plastic and slippery, so that it is easily fashioned and may be squirted into strings or threads. When the mass of silicon and silicon carbid has been fashioned it is strongly heated, preferably in an indifferent atmosphere, for instance, in an electric furnace, to such a temperature that the mass is fritted together to a body as homogeneous and non-porous as possible. Bodies prepared in this manner are distinguished by their high density, resistance to high temperatures, good electrical conductivity and great hardness. They suffer sudden changes of temperature without damage; for example, bodies made in this manner may be sprinkled with water, while they are at a bright-red heat, without developing cracks or flaws, or being otherwise damaged. Moreover, they are well able to withstand powerful chemical agents, like chlorin or concentrated acids, so that they may be used with advantage in electrolytic processes wherein chlorin is liberated.

It is obvious that, although in the foregoing specification the manufacture has been described as consisting in mixing silicon with silicon carbid previously prepared, with or without an agglutinant, the invention also includes the case in which the silicon carbid is produced in the form itself, while this is being heated. For instance, if carbon or carbonaceous material be mixed with more silicon than is essential to form silicon carbid, with or without an agglutinant and the mixture be fashioned and heated as already described, the form produced will have the same properties as if it had been made as hereinbefore described.

What I claim as my invention, and desire to secure by Letters Patent is:

1. A process for the manufacture of fashioned solid bodies containing silicon and carbon, consisting in fashioning the body from a mixture containing silicon carbid and silicon, the silicon being in excess of that required to form silicon carbid with the carbon and heating the fashioned body.

2. A process for the manufacture of fashioned solid bodies containing silicon carbid consisting in fashioning the form from a mixture of powdered silicon carbid and silicon and heating the form thus fashioned.

3. A process for the manufacture of fashioned solid bodies containing silicon carbid consisting in fashioning the form from a mixture of powdered silicon carbid, powdered silicon and an agglutinant and heating the form thus fashioned.

4. A process for the manufacture of fashioned solid bodies containing silicon carbid consisting in fashioning the form from a mixture of powdered silicon carbid, powdered silicon and glycerin and heating the form thus fashioned.

5. As a new article of manufacture a form containing silicon carbid, silicon and an agglutinant.

In testimony whereof I have signed my name to this specification in the presence of two subscribing witnesses.

GEORG EGLY.

Witnesses:
HENRY HASPER,
WOLDEMAR HAUPT.